United States Patent [19]
Roussel

[11] Patent Number: 6,047,333
[45] Date of Patent: *Apr. 4, 2000

[54] NODE ADAPTER INCLUDING HARDWARE ARRANGEMENT FOR FILTERING BROADCAST DATA ON NETWORK

[75] Inventor: Christopher Alan Roussel, Alpharetta, Ga.

[73] Assignee: National Semiconductor Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/867,874

[22] Filed: Jun. 3, 1997

Related U.S. Application Data

[63] Continuation of application No. 08/237,800, May 4, 1994, abandoned.

[51] Int. Cl.[7] .................................................. G06F 13/00
[52] U.S. Cl. ............................................................. 709/250
[58] Field of Search ........................... 395/200.8, 200.79; 370/401, 470; 709/250, 249

[56] References Cited

U.S. PATENT DOCUMENTS

| | | | |
|---|---|---|---|
| 5,124,984 | 6/1992 | Engel | 370/94.1 |
| 5,150,464 | 9/1992 | Sidhu et al. | 395/200.1 |
| 5,265,239 | 11/1993 | Ardolino | 395/500 |
| 5,280,477 | 1/1994 | Trapp | 370/356 |
| 5,444,702 | 8/1995 | Burnett et al. | 370/60.1 |
| 5,490,252 | 2/1996 | Macera et al. | 395/200.01 |
| 5,509,123 | 4/1996 | Dobbins et al. | 395/200.15 |

*Primary Examiner*—John A. Follansbee
*Attorney, Agent, or Firm*—Skjerven, Morrill, MacPherson, Franklin & Friel LLP; Omkar K. Suryadevara; David E. Steuber

[57] ABSTRACT

The node adapter of this invention filters an incoming broadcast data packet transmitted over an information network to determine whether it is in a framing format and a protocol type which is readable by a computer or other device associated with the node adapter. By performing this process in hardware, the node adapter eliminates the need to interrupt the software running on the computer or other device, which conventionally performs the filtering operation.

10 Claims, 4 Drawing Sheets

NODE ADAPTER INCLUDING HARDWARE ARRANGEMENT FOR FILTERING BROADCAST DATA ON NETWORK

This application is a continuation of application Ser. No. 08/237,800, filed May 4, 1994 now abandoned.

FIELD OF THE INVENTION

This invention relates to a technique for filtering broadcast data on an information network so as to determine whether the data is intelligible to a particular computer or other device connected to the network.

BACKGROUND OF THE INVENTION

In computer networks such as Ethernet, broadcast messages are frequently sent out to all stations on the network. Broadcast messages may be used, for example, to advertise the availability of various services (e.g., printers), for routing table maintenance, or for polling individual stations. A single network may link instruments which understand and use different languages or protocols. Each station may understand one or more of these protocols.

Each broadcast message is sent to all stations. Accordingly, each station must receive the message and determine initially whether the message is in a protocol that it can understand. Conventionally, this "filtering" of broadcast messages is performed in software. The computer or other instrument at the station is interrupted from its present task to examine the broadcast packet. First, the framing format of the broadcast packet must be determined, and then the protocol ID fields specified in that framing format must be checked to determine whether the broadcast packet is in a protocol that can be understood by the receiving station. If there is no match, the receive buffer containing the packet is released, and the station returns from the interrupt.

In large local area networks (LAN) where many protocols are used, an individual station may be required to spend a considerable amount of time examining broadcast packets which are in protocols that it cannot understand. This may constitute a significant overhead for the station's central processing unit (CPU).

SUMMARY OF THE INVENTION

In accordance with this invention, the filtering of broadcast packets is performed in hardware. A node adapter, which serves as an interface between an individual station and the network, includes circuitry, preferably in the form of an integrated circuit, which filters broadcast packets to determine whether they are in a protocol that is intelligible to the station.

The circuitry includes a common logic unit which identifies the framing format of the received broadcast packet and a memory unit which stores representations of one or more framing formats and protocols that are acceptable by the station. A pattern match unit receives the stored protocol representations and compares them against the particular bits of the broadcast packet at which the protocol type would be represented, for various framing format types. If there is a match, a signal is sent to a frame type match unit. The frame type match unit receives a signal from the common logic unit indicating the framing format of the packet, a signal from the memory indicating one or more framing formats that are acceptable by the station, and a signal from the pattern match unit indicating whether, for any framing format, there is a match between the stored protocol type and the protocol type of the packet. If there is such a match, the frame type match unit generates a signal indicating that the broadcast packet should be accepted. If there is no such match, no broadcast accept signal is generated, and the broadcast packet is not accepted. In the latter case, the computer or other instrument at the station continues to operate without interruption.

DESCRIPTION OF THE INVENTION

Figure 1:
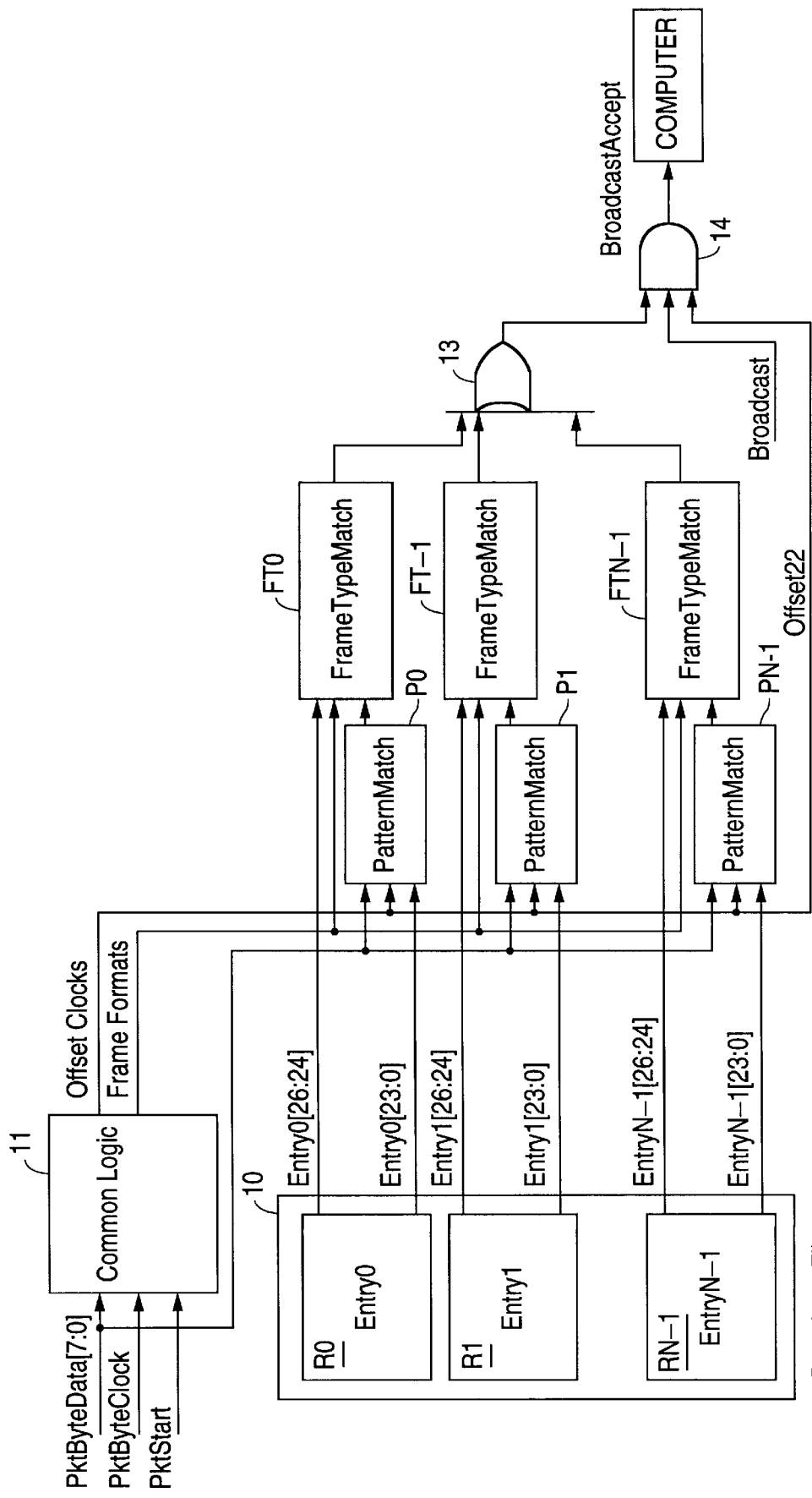
FIG. 1 illustrates a system diagram of the broadcast filter portion of a node adapter in accordance with the invention.

This invention will be described with reference to an Ethernet network, although it will be appreciated that the broad principles of this invention are applicable to a wide variety of information networks. On an Ethernet network, there are four standardized ways of framing information. These are referred to, respectively, as Ethernet/DIX, IEEE 802.2, IEEE 802 SNAP, and RFC 1042. The structure of a broadcast packet in each of these framing formats is summarized in Tables 1–4 below. In each instance, the destination address (hexadecimal FF FF FF FF FF FF) is the standardized address for a broadcast packet. For packets other than broadcast packets, this address would specify the particular station for which the packet was intended.

TABLE 1

Ethernet/DIX Format

| data | offset | description |
|---|---|---|
| FF FF FF FF FF FF | 0 | destination MAC address (broadcast) |
| ss ss ss ss ss ss | 6 | source MAC address |
| tt tt | 12 | Protocol type (always > 1500) |
| . . . data . . . | 14 | 0–1500 bytes of data |

For Ethernet/DIX packets, the protocol is identified by a two-byte (16-bit) field at offsets 12 and 13 in the packet. This designation is always greater than a decimal 1500.

TABLE 2

IEEE 802.2 Format

| data | offset | description |
|---|---|---|
| FF FF FF FF FF FF | 0 | destination MAC address (broadcast) |
| ss ss ss ss ss ss | 6 | source MAC address |
| ll ll | 12 | length of the rest of the packet (always ≤ 1500) |
| ds | 14 | Protocol type. DSAP (destination service access point) |
| ss | 15 | SSAP (Source service access point) |
| ct | 16 | Control (one or two bytes) |
| . . . data . . . | 17 or 18 | 0–1497 bytes of data |

IEEE 802.2 packets are distinguishable from Ethernet/DIX packets in that the binary word at offsets 12 and 13 is always less than or equal to 1500. The protocol is identified by a two-byte word at offset 14.

TABLE 3

IEEE 802 SNAP Format

| data | offset | description |
| --- | --- | --- |
| FF FF FF FF FF FF | 0 | destination MAC address (broadcast) |
| ss ss ss ss ss ss | 6 | source MAC address |
| ll ll | 12 | length of the rest of the packet (always ≦ 1500) |
| AA | 14 | DSAP = SNAP SAP |
| AA | 15 | SSAP = SNAP SAP |
| 03 | 16 | Control |
| oo oo oo | 17 | Protocol type. OUI (Organizationally Unique Identifier) |
| tt tt | 20 | Vendor administered protocol sub-type. |
| . . . data . . . | 22 | 0–1492 bytes of data |

For IEEE 802 SNAP packets, the binary word at offsets 12 and 13 is always less than or equal to 1500, and the hexadecimal value AA appears at offsets 14 and 15. The protocol is identified by a three-byte word at offsets 17 through 19.

TABLE 4

RFC 1042 Format

| data | offset | description |
| --- | --- | --- |
| dd dd dd dd dd dd | 0 | destination MAC address (broadcast) |
| ss ss ss ss ss ss | 6 | source MAC address |
| ll ll | 12 | length of the rest of the packet (always ≦ 1500) |
| AA | 14 | DSAP = SNAP SAP |
| AA | 15 | SSAP = SNAP SAP |
| 03 | 16 | Control |
| oo oo oo | 17 | OUI (Organizationally Unique Identifier) = "00 00 00" |
| tt tt | 20 | Protocol type, Ethernet/DIX |
| . . . data . . . | 22 | 0–1492 bytes of data |

For the RFC 1042 format, the binary word at offsets 12 and 13 is less than or equal to 1500, both offsets 14 and 15 contain the value AA, and offsets 17 through 19 contain the value 00 00 00. The protocol type (which, for a given protocol, is the same value as the Ethernet/DIX protocol type) is a two-byte word found at offsets 20 and 21.

FIG. 1 illustrates a system diagram of a node adapter in accordance with this invention. A broadcast filter configuration table 10 includes a plurality of configurable registers R0, R1 through RN–1. In this embodiment, each of registers R0 through RN–1 holds 27 bits, and registers R0 through RN–1 are programmed by the user to indicate the particular framing formats and protocols that the station is to accept. The structure of the data stored in registers R0 through RN–1 is illustrated in Table 5.

TABLE 5

Broadcast Filter Configuration Table Entry

| bit number | width | description |
| --- | --- | --- |
| 26 | 1 | 1 = enable this entry, 0 = disable this entry |
| 25-24 | 2 | frame format type where:<br>00 Ethernet/DIX<br>01 IEEE 802.2<br>10 IEEE 802 SNAP<br>11 RFC 1042 |
| 23-0 | 24 | pattern data for comparison with the packet (left justified) |

As indicated, each of registers R0 through RN–1 includes a 27-bit word. In FIG. 1, these words are designated Entry0 through EntryN–1, respectively. Bit 26 is used to disable entries that are not to be used. Bits 24 and 25 contain a word which indicates which one of the four format types is to be accepted, and bits 0 through 23 contain a 24-bit word (left justified) which identifies the protocol type. Not all pattern data bits are used in every frame format.

Referring again to FIG. 1, a common logic unit 11 has as an input an 8-bit parallel bus designated PktByteData. PktByteData carries the broadcast data packets that are to be analyzed by the filtering apparatus.

A second input to common logic unit 11 is designated PktByteClock. PktByteClock is a clock which indicates when data is valid on the PktByteData bus. In general, the frequency of PktByteClock is the frequency of the Ethernet divided by the width of the data stream. Thus, for an Ethernet operating at 10 MHz and having an 8-bit data stream, the frequency of PktByteClock would be 1.25 MHz. A third input to common logic unit 11, designated PktStart, is asserted when the PktByteData bus contains a first byte of data within a packet.

The PktByteData bus is also connected as an input to a plurality of PatternMatch units P0 through PN–1. Each of PatternMatch units P0 through PN–1 also receives as an input bits 0 through 23 from a corresponding one of registers R0 through RN–1. The outputs of PatternMatch units P0 through PN–1 are delivered, respectively, to a corresponding one of FrameTypeMatch units FT0 through FTN–1. Each of FrameTypeMatch units FT0 through FTN–1 also receives as an input bits 24 and 25 of a corresponding one of registers R0 through RN–1.

The respective outputs of FrameTypeMatch units FT0 through FTN–1 are delivered to an OR gate 13, whose output is directed to an AND gate 14. The other inputs of AND gate 14 are a signal designated Offset22 from common logic unit 11 and a signal designated Broadcast, which is asserted if the current packet is a broadcast packet. The output of AND gate 14, designated BroadcastAccept, is asserted when the broadcast packet is to be received by the computer or other instrument with which the node adapter shown in FIG. 1 is associated.

Figure 2A:
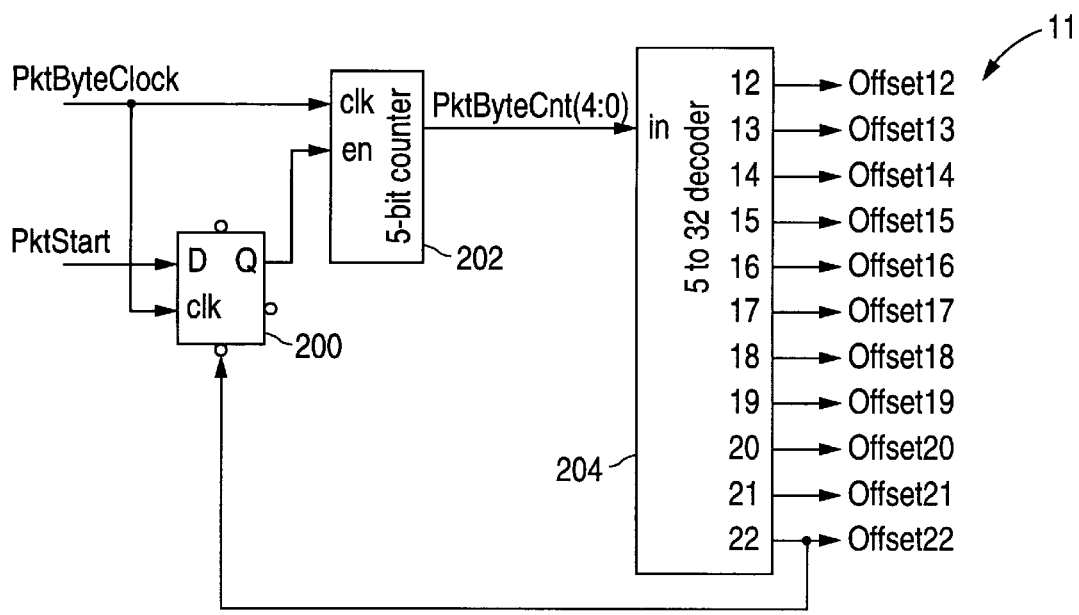
FIGS. 2A and 2B illustrate a logic diagram of the common logic unit within the node adapter.
Figure 2B:
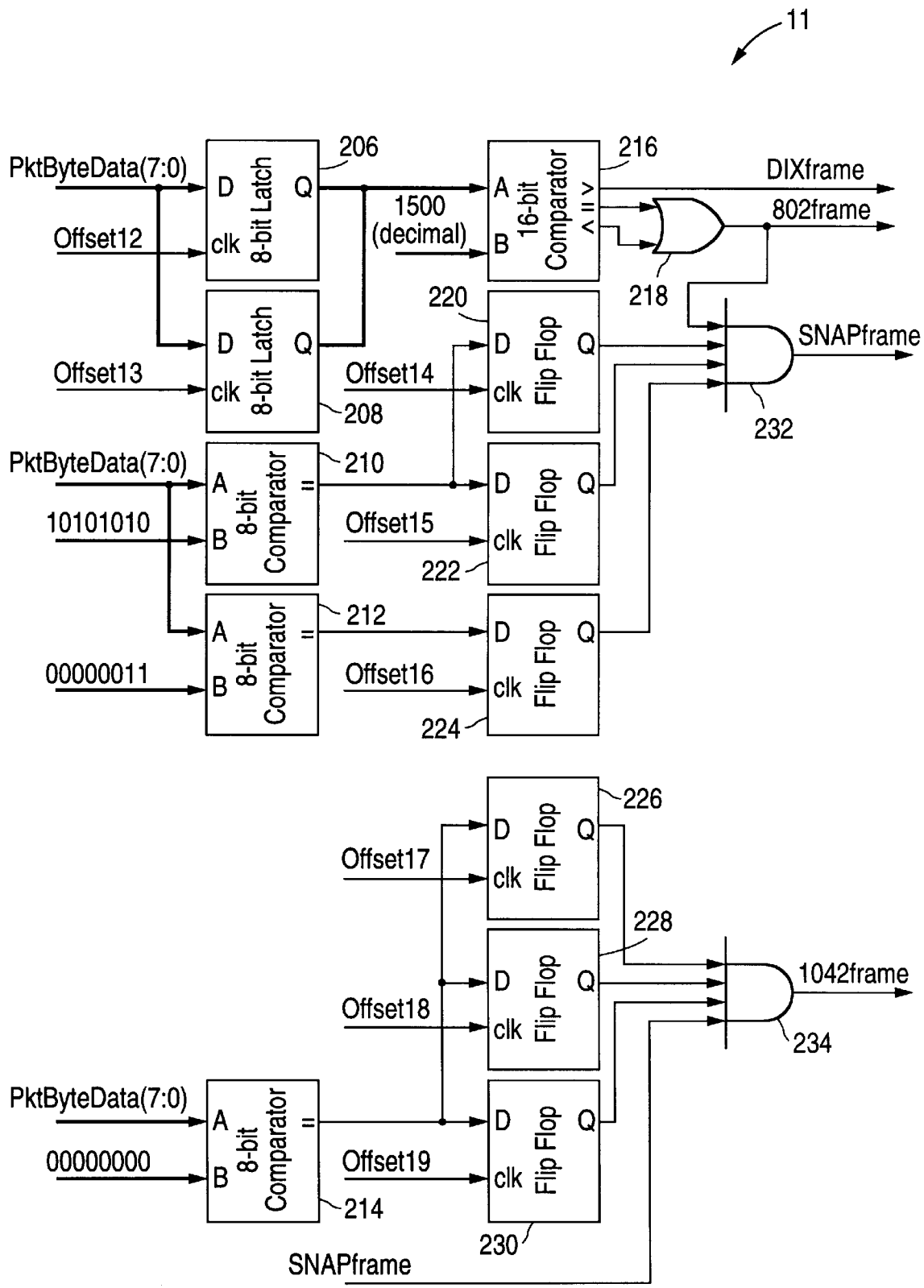

FIGS. 2A, 2B, 3 and 4 illustrate detailed views of the structure of common logic unit 11, PatternMatch units P0 through PN–1, and FrameTypeMatch units FT0 through FTN–1. FIGS. 2A and 2B illustrate logic diagrams of common logic unit 11. The portion of common logic unit 11 illustrated in FIG. 2A contains a flip-flop 200, a 5-bit counter 202, and a 5-to-32 decoder 204. The PktByteClock signal is delivered to the respective clock inputs of flip-flop 200 and counter 202. The PktStart signal is delivered to the data input of flip-flop 200. The output of 5-bit counter 202 is directed to the input of 5-to-32 decoder 204. As described above, the PktStart signal is asserted when the PktByteData bus contains the first byte of data within a packet, and the PktByteClock signal is synchronized with the arrival of bits on the PktByteData bus. Thus, counter 202 is advanced with the arrival of each group of parallel data bits, and the output of counter 202 is used to trigger decoder 204 to the next state. Decoder 204 has eleven outputs, corresponding respectively to offset 12 through offset 22 of each packet received on the PktByteData bus.

As shown in FIG. 2B, the outputs representing offset 12 through offset 19 are delivered to other components of common logic unit 11. The circuitry illustrated in FIG. 2B includes 8-bit latches 206 and 208 and 8-bit comparators 210, 212 and 214. Also included is a 16-bit comparator 216. Each of 8-bit comparators 210, 212 and 214 has two inputs. Comparators 210, 212 and 214 have a single output which is activated when the inputs are equal, and comparator 216 has three outputs indicating, respectively, when input A is greater than, equal to or less than input B. The latter two outputs of comparator 216 are connected to an OR gate 218.

Common logic unit 11 also includes flip-flops 220, 222, 224, 226, 228 and 230. The outputs of flip-flops 220, 222 and 224 and OR gate 218 are connected to an AND gate 232, and the outputs of flip-flops 226, 228 and 230 and AND gate 232 are connected to an AND gate 234.

Referring to Tables 1–4, it will be apparent that signals delivered at the "greater than" output of comparator 216 and the outputs of OR gate 218, AND gate 232 and AND gate 234, respectively, indicate the framing format of an incoming data packet. The PktByteData bus is connected in common to the data inputs of 8-bit latches 206 and 208. The offset 12 output of decoder 204 is connected to the clock input of latch 206, and the offset 13 output of decoder 204 is connected to the clock input of latch 208. A binary pattern representing decimal 1500 is delivered to input B of 16-bit comparator 216. Referring to Table 1, the Ethernet/DIX format is typified by a number greater than 1500 at offsets 12 and 13. Thus, the "greater than" output of comparator 216 is activated when input A is greater than input B, and indicates that the packet is in the Ethernet/DIX format. The signal at the "greater than" output of comparator 216 is designated DIXframe.

Conversely, if the word at offsets 12 and 13 is less than or equal to 1500, the "less than" or "equal" outputs of comparator 216 will be activated, and the output of OR gate 218 will be active. This output is designated 802frame and, as indicated in Tables 2–4, this indicates that the packet is in the 802.2, 802SNAP or RFC 1042 formats.

The PktByteData bus is connected to the respective A inputs of comparators 210 and 212. The hexadecimal AA (10101010) is delivered to input B of comparator 210, and hexadecimal 03 (00000011) is delivered to input B of comparator 212. The "equal" output of comparator 210 is passed to the data inputs of flip-flops 220 and 222, and the "equal" output of comparator 212 is delivered to the data input of flip-flop 224. Flip-flop 220 is clocked by offset 14, flip-flop 222 is clocked by offset 15, and flip-flop 224 is clocked by offset 16. Referring to Tables 3 and 4, when AA is at offsets 14 and 15, flip-flops 220 and 222 deliver inputs to AND gate 232; and when 03 is at offset 16, flip-flop 224 delivers an output to AND gate 232. When the binary value at offsets 12 an 13 is less than or equal to 1500, the 802frame signal is generated by OR gate 218, and this signal is delivered as a fourth input to AND gate 232. AND gate 232 thus generates a signal, designated SNAPframe, which indicates that the packet is in either the 802SNAP or RFC 1042 formats.

The PktByteData bus is connected to input A of comparator 214, and 00000000 is delivered to input B of comparator 214. The "equal" output of comparator 214 is connected to the respective data inputs of flip-flops 226, 228 and 230.

Flip-flop 226 is clocked by offset 17, flip-flop 228 is clocked by offset 18, and flip-flop 230 is clocked by offset 19. Thus, referring to Table 4, when offsets 17, 18 and 19 each contain a 00, and when the SNAPframe signal is generated, an output, designated 1042frame, is delivered from AND gate 234. The 1042frame signal indicates that the packet is in the RFC 1042 format.

Figure 3:
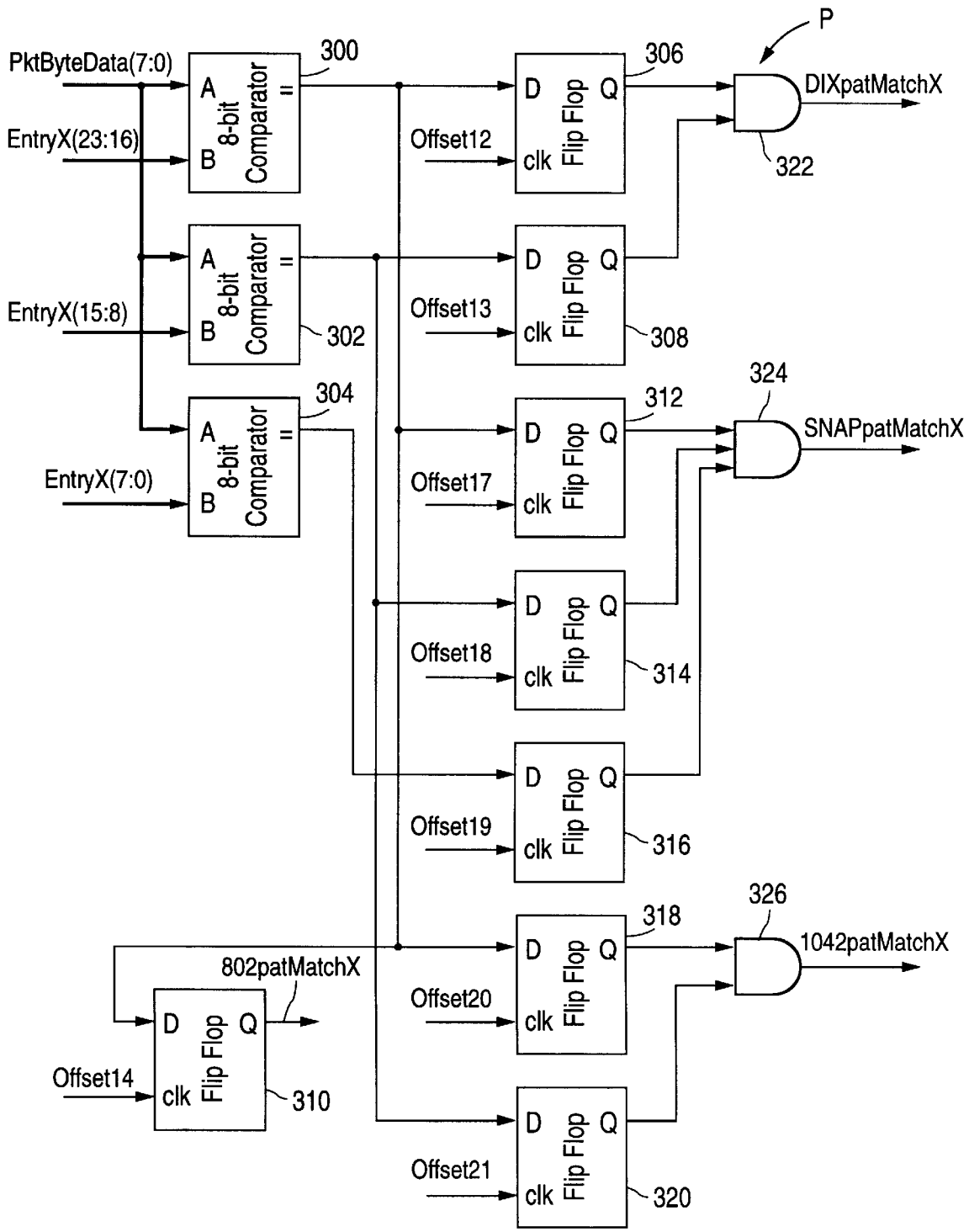
FIG. 3 illustrates a logic diagram of one of the Pattern-Match units within the node adapter.

FIG. 3 illustrates a logic diagram of a PatternMatch unit P, which is representative of PatternMatch units P0 through PN–1 in FIG. 1. PatternMatch unit P contains 8-bit comparators 300, 302 and 304. The output of comparator 300 is connected to the respective data inputs of flip-flops 306, 310, 312 and 318. The output of comparator 302 is connected to the respective data inputs of flip-flops 308, 314 and 320. The output of comparator 304 is connected to the data input of flip-flop 316. The outputs of flip-flops 306 and 308 are fed to the inputs of an AND gate 322, the outputs of flip-flops 312, 314 and 316 are fed to the inputs of an AND gate 324, and the outputs of flip-flops 318 and 320 are fed to the inputs of an AND gate 326.

The PktByteData bus is connected to the respective A inputs of comparators 300, 302, and 304. Lines carrying bits 16 through 23 of a 27-bit word stored in one of registers Ro through RN–1, designated EntryX(23:16), are connected to input B of comparator 300. Lines carrying bits 8 through 15 of the 27-bit word stored at one of registers R0 through RN–1, designated EntryX(15:8), are connected to input B of comparator 302. Lines carrying bits 0 through 7 of a 27-bit word stored in one of registers R0 through RN–1, designated EntryX(7:0), are connected to input B of comparator 304. Hereinafter, EntryX is used to designate a particular word stored in the register that is associated with a particular PatternMatch unit.

Referring to Table 1, in the Ethernet/DIX format, the protocol type is located at offsets 12 and 13. The output of comparator 300 is directed to flip-flop 306, which is clocked at offset 12, and the output of comparator 302 is directed to flip-flop 308, which is clocked at offset 13. Thus, if the respective outputs of flip-flops 306 and 308 are asserted, there is a match between a protocol type stored in EntryX and an incoming packet framed in the Ethernet/DIX format. This is indicated by an output from AND gate 322, designated DIXpatMatchX.

Referring to Table 2, in the IEEE 802.2 format, the protocol type is located at offset 14. Since flip-flop 310 is clocked at offset 14, the output of flip-flop 310, designated 802patMatchX, indicates that the incoming packet is in an acceptable protocol type if the packet is framed in the IEEE 802.2 format.

Referring to Table 3, in the IEEE 802 SNAP format, the protocol type is located at offsets 17 through 19. The output of comparator 300 is directed to flip-flop 312, which is clocked at offset 17; the output of comparator 302 is directed to flip-flop 314, which is clocked at offset 18; and the output of comparator 304 is directed to flip-flop 316, which is clocked at offset 19. Thus, if the respective outputs of flip-flops 312, 314 and 316 are all asserted, there is a match between a protocol type stored in EntryX and an incoming packet framed in the IEEE 802 SNAP format. This is indicated by an output from AND gate 324, designated SNAPpatMatchX.

Referring to Table 4, in the RFC 1042 format, the protocol type is located at offsets 20 and 21. The output of comparator 300 is directed to flip flop 318, which is clocked at offset 20; and the output of comparator 302 is directed to the input of flip flop 320, which is clocked at offset 21. Thus, if the respective outputs of flip flops 318 and 320 are asserted, there is a match between a protocol type stored in EntryX and an incoming packet framed in the RFC 1042 format. This is indicated by an output from AND gate 326, designated 1042patNatchX.

Figure 4:
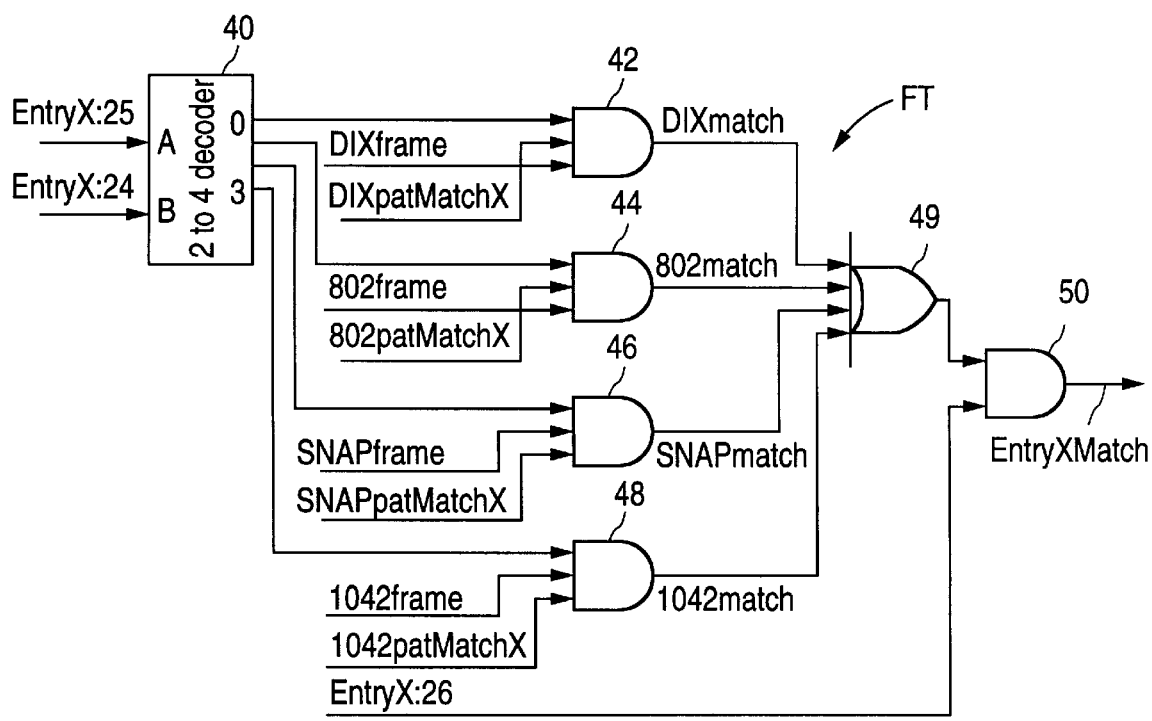
FIG. 4 illustrates a logic diagram of one of the Frame-TypeMatch units within the node adapter.

The signals from common logic unit 11 and PatternMatch units P0 through PN−1 are delivered to FrameTypeMatch units FT0 through FTN−1, exemplified by FrameTypeMatch unit FT illustrated in FIG. 4. FrameTypeMatch unit FT contains a 2-to-4 decoder 40, AND gates 42, 44, 46 and 48, and an OR gate 49. The inputs to decoder 40 are bits 24 and 25 of the 27-bit word stored in one of registers R0 through RN−1, designated EntryX:24 and EntryX:25, respectively. As indicated in Table 5, EntryX:24 and EntryX:25 designate the frame format that is to be received by the network station. If EntryX:24 and EntryX:25 are 00, indicating the Ethernet/DIX format, the 0 output of decoder 40 is asserted and this signal is delivered to an input of AND gate 42. The other inputs of AND gate 42 are the DIXframe and DIXpatMatchX signals. As indicated above, the DIXframe signal indicates that the received packet is in the Ethernet/DIX framing format and the DIXpatMatchX signal indicates that the word at offsets 12 and 13 of the packet matches the protocol type stored in EntryX. Thus, if all of the inputs of AND gate 42 are asserted, the incoming packet is in a framing format and protocol type that can be received by the network station, and AND gate 42 delivers an output designated DIXmatch to an input of OR gate 49.

If the framing format stored in EntryX is IEEE 802.2, the 1 output of decoder 40 is asserted and delivered to AND gate 44. The other inputs of AND gate 44 are the 802frame and 802patMatchX signals indicating, respectively, that the incoming packet is in the IEEE 802.2 format and that there is a correspondence between the protocol type stored in one of registers R0 through RN−1 and the word at offset 14 of the packet. Accordingly, AND gate 24 delivers an output, designated 802match to an input of OR gate 49.

If a representation of IEEE SNAP is stored in EntryX, the 2 output of decoder 40 is asserted and passed to an input of AND gate 46. AND gate 46 has two other inputs. As indicated above, the SNAPframe signal indicates that the word at offsets 12 and 13 is less than or equal to 1500, that AA is found at offsets 14 and 15 of the incoming packet, and that 03 is found at offset 16 of the incoming packet. Thus, the conjunction of the 802frame and SNAPframe signals indicates that the packet is in the IEEE 802 SNAP format. The SNAPpatMatchX signal indicates a match between the protocol type stored in EntryX and the protocol type specified at offsets 17 through 19 of the incoming packet. Accordingly, AND gate 46 delivers an output, designated SNAPmatch, when an acceptable packet in the IEEE 802 SNAP format has been received. This signal is delivered to an input of OR gate 49.

When the framing format stored in EntryX is in the RFC 1042 format, the 3 output of decoder 40 is asserted and delivered to AND gate 48. AND gate 48 has two additional inputs. The 1042frame signal indicates that the incoming packet is in the RFC 1042 format. The 1042patMatchX signal indicates a correspondence between the protocol type stored in EntryX and the protocol type indicated at offsets 20 and 21 of the packet. Thus, an output of AND gate 48 indicates that the packet is in the RFC 1042 format and in a protocol type acceptable by the network station. The 1042match signal is delivered to an input of OR gate 49.

The output of OR gate 49 indicates that EntryX contains stored representations of a framing format and protocol type which matches the framing format and protocol type of a received packet. The output of OR gate 49 is passed to AND gate 50. The other input to AND gate 50 is bit 26 of the 27-bit word stored in one of registers R0 through RN−1, designated EntryX:26, which is a binary 1 if the particular register is enabled. If the register is enabled, AND gate 50 delivers an output designated EntryXMatch. Referring again to FIG. 1, the outputs of FrameTypeMatch units FT0 through FTN−1 are passed to the inputs of OR gate 13. The output of OR gate 13, together with the Offset22 signal from common logic unit 11 and the Broadcast signal, are applied at the inputs of AND gate 14. Accordingly, when there is a correspondence between the framing format and protocol type stored in any one of registers R0 through RN and the framing format and protocol type of a received broadcast packet, AND gate 14 delivers a BroadcastAccept signal upon the arrival of Offset22 of the packet. As is apparent from Tables 1–4, all of the framing and protocol information in a data packet are contained in offsets 1 through 21. Thus, upon the arrival of Offset22, a determination whether the packet is acceptable can be made. As noted above, the Broadcast signal is generated if the packet is a broadcast packet (i.e., the address is FF FF FF FF FF FF).

While a particular embodiment of this invention has been described, it will be apparent to those skilled in the art that the broad principles of this invention may be practiced in numerous alternative embodiments. For example, while the described embodiment is related to the Ethernet network, this invention is applicable to other types of information networks. This invention, as defined in the following claims, is intended to include all such alternative embodiments.

I claim:

1. An apparatus including a station and a node adapter connected between said station and a data network, said node adapter comprising:

a common logic hardware unit, said common logic unit delivering an output indicating whether a data packet received by said node adapter is in a selected framing format; and a frame type match hardware unit, said frame type match unit receiving said output from said common logic unit and delivering an output indicating whether a protocol type represented in said data packet is a protocol type acceptable by said station, wherein said node adapter is for examining a broadcast packet on said data network to determine whether said broadcast packet is in a form that is intelligible to said station; and said station comprising:

a central processing unit for execution of software in an uninterrupted manner until after said node adapter finds said protocol type of said broadcast packet to be acceptable by said station.

2. The apparatus of claim 1 wherein the node adapter further comprises a pattern match unit, said pattern match unit delivering a output indicating whether a binary word represented by selected bits of said data packet specifies a selected protocol type, an output of said pattern match unit being delivered to said frame type match unit.

3. The apparatus of claim 2 wherein the node adapter further comprises a memory, said memory storing a first binary word representative of a protocol type, said first binary word being passed from said memory to said frame type match unit.

4. The apparatus of claim 3 wherein said pattern match unit comprises a comparator for comparing said first binary word from said memory with said binary word represented by said selected bits of said data packet.

5. The apparatus of claim 3 wherein said memory also stores a second binary word representative of a framing format type, said second binary word being passed to said frame type match unit.

6. The apparatus of claim 5 wherein said frame type match unit comprises an AND gate, said AND gate receiving a first input comprising a first input comprising said second binary word, a second input comprising said output of said common logic unit, and a third input comprising said output of said pattern match unit.

7. The apparatus of claim 1 wherein the node adapter further comprises means for determining whether said data packet is a broadcast packet.

8. An apparatus including a station and a node adapter connected between said station and a data network, said node adapter comprising:

hardware for identifying the framing format of a data packet on said network;

hardware for identifying the protocol type of said data packet;

a memory for storing representations of a particular framing format and a particular protocol type;

hardware for comparing a representation of said framing format of said data packet with said representation of a particular framing format;

hardware for comparing a representation of said protocol type of said data packet with said representation of a particular protocol type; and hardware for generating a broadcast accept signal if both of said hardware for comparing produce a match indication;

wherein said node adapter is for examining a broadcast packet on said data network to determine whether said broadcast packet is in a form that is intelligible to said station, and said station comprising:

means for execution of software in an uninterrupted manner until after said node adapter finds said protocol type of said broadcast packet to be acceptable by said station.

9. The apparatus of claim 8 wherein said memory passes a binary word representative of said particular protocol type to said hardware for comparing a representation of said protocol type.

10. The apparatus of claim 8, wherein said hardware for comparing a representation of said framing format comprises an AND gate, said AND gate receiving a first input comprising a first input comprising a second binary word.

* * * * *